(12) United States Patent
Woodnorth et al.

(10) Patent No.: US 7,640,845 B2
(45) Date of Patent: Jan. 5, 2010

(54) DRAIN FOR BEVERAGE FORMING MACHINE

(75) Inventors: Douglas Woodnorth, Needham, MA (US); William T. Jacobs, Lynnfield, MA (US); Robert M. Pelovitz, Nashua, NH (US)

(73) Assignee: Keurig, Incorporated, Reading, MA (US)

( * ) Notice: Subject to any disclaimer, the term of this patent is extended or adjusted under 35 U.S.C. 154(b) by 615 days.

(21) Appl. No.: 11/224,672

(22) Filed: Sep. 12, 2005

(65) Prior Publication Data

US 2007/0056994 A1   Mar. 15, 2007

(51) Int. Cl.
*A47J 31/00* (2006.01)
(52) U.S. Cl. .................. 99/300; 99/280; 99/302 R
(58) Field of Classification Search ............ 99/295, 99/300, 302 R, 307, 280
See application file for complete search history.

(56) References Cited

U.S. PATENT DOCUMENTS

| | | |
|---|---|---|
| 808,148 A | 12/1905 | Ernst |
| 819,448 A | 5/1906 | Myers |
| 847,977 A | 3/1907 | Ballard |
| 873,144 A | 12/1907 | Wright |
| 3,584,568 A | 6/1971 | Hausam |
| 4,143,589 A | 3/1979 | Weber |
| 4,421,014 A | 12/1983 | Vicker |
| 4,966,070 A | 10/1990 | Frisch |
| 4,974,500 A | 12/1990 | Boyd et al. |
| 5,134,925 A | 8/1992 | Bunn et al. |
| 5,255,593 A | 10/1993 | Bunn et al. |
| 5,299,595 A | 4/1994 | Ribeiro |
| 5,302,407 A | 4/1994 | Vetterli |
| 5,303,639 A | 4/1994 | Bunn et al. |
| 5,312,637 A | 5/1994 | Midden |
| 5,943,944 A | 8/1999 | Lassota |
| 6,079,317 A | 6/2000 | Fukushima et al. |
| 6,155,158 A | 12/2000 | Anson |
| 6,164,189 A | 12/2000 | Anson |
| 6,227,101 B1 | 5/2001 | Rabadi et al. |
| 6,272,973 B1 | 8/2001 | Fukushima et al. |
| 6,339,985 B1 | 1/2002 | Whitney |
| 6,401,729 B1 | 6/2002 | Ford |
| 6,575,081 B2 | 6/2003 | Kanba et al. |
| 6,685,059 B2 | 2/2004 | Jones et al. |
| 7,021,197 B2 * | 4/2006 | Chen et al. .................. 99/291 |
| 7,089,849 B2 * | 8/2006 | Chen et al. .................. 99/290 |
| 2002/0121197 A1 | 9/2002 | Mercier et al. |
| 2005/0003052 A1 | 1/2005 | Brouwer |

(Continued)

FOREIGN PATENT DOCUMENTS

DE          20217068          4/2004

(Continued)

*Primary Examiner*—Reginald L Alexander
(74) *Attorney, Agent, or Firm*—Wolf, Greenfield & Sacks, P.C.

(57) ABSTRACT

A method and apparatus for draining a component of a beverage forming system such as a coffee brewer. A tank used for holding and/or heating a beverage precursor liquid may be automatically drained. A beverage forming machine including a drain system may be self-contained in that the liquid drained from the tank is held by another tank that is part of the beverage forming machine. The tank into which the drained liquid is deposited may be removable from the beverage forming machine.

39 Claims, 4 Drawing Sheets

U.S. PATENT DOCUMENTS

2005/0061156 A1 3/2005 Hart et al.
2006/0292012 A1 12/2006 Brudevold et al.

FOREIGN PATENT DOCUMENTS

| | | |
|---|---|---|
| EP | 801923 | 10/1997 |
| EP | 1000575 | 5/2000 |
| GB | 808148 A | 1/1959 |
| GB | 819448 A | 9/1959 |
| GB | 866680 A | 4/1961 |
| JP | 06096354 A | 4/1994 |
| WO | WO03/000101 A1 | 1/2003 |

\* cited by examiner

DRAIN FOR BEVERAGE FORMING MACHINE

BACKGROUND OF INVENTION

1. Field of Invention

This invention relates to methods and apparatus for draining a component of a beverage forming machine.

2. Discussion of Related Art

Draining a beverage forming machine, such as a coffee brewer, before storing the machine can help prevent spills, protect the machine from freezing damage and/or reduce the weight of the machine. For example, some commercial coffee brewer machines include a tank that is used to heat and store water before it is used to prepare coffee. Before storing the machine, the tank may be manually drained into a sink or a floor drain with a drain tube, e.g., by removing a plug from a drain line. In some smaller machines, such as single serve coffee brewer machines, draining the hot water tank cannot be done by a consumer.

SUMMARY OF INVENTION

The inventors have appreciated that an automatic and/or self-contained drain system would facilitate the draining of some beverage forming machines, such as single serve coffee brewers. For example, some single serve coffee brewers have a water tank for heating and/or storing water which is used to brew coffee. In these coffee brewers, a certain amount of the water can be withdrawn from the tank by dispensing it through the normal dispensing tube to a beverage forming station. However, some water always remains in the hot water tank because of the arrangement of the dispensing tube in the tank. Leaving a certain amount of water in the tank may be important, such as to keep a heating element submerged in water so it does not burn out.

In one aspect of the invention, a beverage forming system includes a housing and a tank attached to the housing for holding a beverage precursor liquid, such as water. A beverage forming station is also attached to the housing and is configured to form a beverage in part by using the beverage precursor liquid. For example, the beverage forming station may provide heated water received from the tank to a beverage forming cartridge (a pod or sealed capsule) that includes ground, roasted coffee and a filter element to make a coffee beverage. A supply system is configured to provide beverage precursor liquid from the tank to the beverage forming station, and a drain system is configured to substantially empty the tank of beverage precursor liquid. A controller may be adapted to control the drain system to automatically drain the tank, e.g., by pressing a drain button on the housing to provide a drain command to the controller. In accordance with this aspect of the invention, a user may control a beverage forming system, such as a coffee brewer, to automatically remove liquid from an internal tank that the user could not otherwise empty. Such a feature may be useful, e.g., when storing the beverage forming system in conditions in which water remaining in the system may freeze.

In one embodiment, the controller may operate in a beverage forming mode in which the controller is adapted to control the supply system to provide beverage precursor liquid from the tank to the beverage forming station for forming the beverage. The controller may also operate in a drain mode in which the controller is adapted to control the drain system to automatically perform the drain operation. A user may interact with an interface to provide instructions to cause the controller to operate in either the beverage forming mode or the drain mode.

In another aspect of the invention, a beverage forming apparatus includes a housing and a beverage forming station attached to the housing and configured to form a beverage in part using a beverage precursor liquid. A tank that is also attached to the housing may be configured to supply the beverage precursor liquid to the beverage forming station. A reservoir may also be supported by the housing, and a drain system may be configured to substantially empty the beverage precursor liquid from the tank into the reservoir. In accordance with this aspect of the invention, liquid drained from the tank may be emptied into a receptacle associated with the beverage forming apparatus itself, rather than into a receptacle separate from the apparatus. This may provide for more convenient draining of the tank, e.g., avoiding the need for a user to move the apparatus near a sink.

In one embodiment, the reservoir may be removable from the housing and/or may be used to supply the beverage precursor liquid to the tank. For example, the reservoir may be a water storage tank that may be filled with water by a user for use in making beverages. In another embodiment, the reservoir may be a waste tank that is used only to receive liquid drained from the tank via a pathway that does not include the beverage forming station.

In one embodiment, the apparatus may include a controller adapted to control the drain system to automatically move the beverage precursor liquid from the tank to the reservoir. For example, the controller may control the drain system to automatically drain the tank in response to an input from a user.

In another aspect of the invention, a method for draining the contents of a tank used in a beverage forming machine includes providing a beverage forming machine having a tank, a reservoir arranged to supply beverage precursor liquid to the tank, and a beverage forming station fluidically connected to the tank. A volume of a beverage precursor liquid may be provided to the tank, and the tank may be substantially emptied of the beverage precursor liquid by removing the beverage precursor liquid from the tank and depositing the beverage precursor liquid in the reservoir.

These and other aspects of the invention will be apparent from the following description and claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
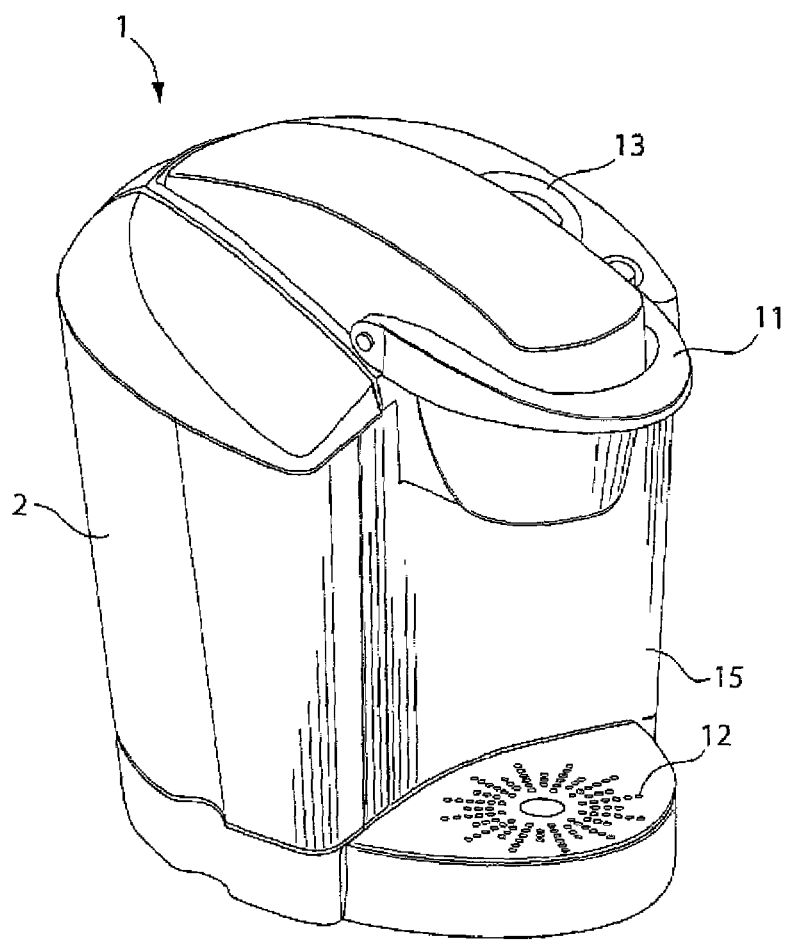
FIG. 1 shows a perspective view of a beverage forming system having a removable reservoir in accordance with aspects of the invention.

Aspects of the invention may be practiced with any beverage forming system using any suitable fluid handling and/or control arrangement. Several different embodiments are described herein for purposes of illustration. However, these illustrative embodiments should not be used to narrowly interpret the scope of the invention. For example, embodiments are described below in which a beverage forming apparatus includes an air pressurization system for ejecting liquid from a tank, but aspects of the invention are not limited to this type of arrangement. As an example, aspects of the invention may be used in systems including no air pressurization system, e.g., a system that uses only liquid pumps and/or gravity for movement of liquid. In addition, various aspects of the invention are described herein, and these various aspects may be used in any suitable combination with each other, or alone.

In one aspect of the invention, a beverage forming system controller may control a set of valves, pumps, tanks and/or other fluid handling devices in a beverage forming machine to automatically drain a tank of a beverage precursor liquid. The combination of the controller and the fluid handling devices may permit a user to initiate automatic draining simply by pressing one or more buttons. Instead of, or in addition to responding to a user's input, the beverage forming machine may automatically drain in response to the attainment of another pre-selected condition, such as the cooling of the liquid in a tank below a certain temperature or the passage of an amount of time during which the liquid is contained in the tank.

For purposes herein, the term "automatic" draining means draining that occurs in response to an electronic control signal (or signals) and does not include solely a manual operation of a flow control component such as a valve, plug, crimp, kink or other stopper component. However, "automatic" draining may incorporate some manual action, such as the pressing of a button to cause the draining to occur or manual actuation of a valve or other flow control component. All that "automatic" draining requires herein is that some electronic component be actuated to facilitate draining.

A "tank", for purposes herein, means any tank, receptacle, container, reservoir, urn, conduit, tube, hose, pipe or other suitable vessel that can store a volume of liquid. For example, a "tank" may include an inline or flash heater, a chamber in which a volume of water is heated and stored, or other arrangement. Also, for purposes herein, a tank for holding a beverage precursor liquid is a tank that may hold liquid to be transferred to a beverage forming station for use in forming a beverage. A coffee pot or other receptacle that receives a finished beverage from a beverage dispenser is not considered to be a tank for holding a beverage precursor liquid, for purposes herein. In some embodiments, a tank for holding a beverage precursor liquid is fluidically connected to a beverage forming station. For purposes herein, the term "fluidically connected" means any of: a connection between two components using one or more open tubes, pipes, channels, etc.; a connection that may be selectively opened and closed by a valve or other component; and/or a connection in which one or more intermediate receptacles or tanks (such as a metering chamber or a reservoir) are used, but fluid is able to move from a first component to a second component either manually or automatically. A fluidic connection does not require that fluid be able to travel in both directions.

In one embodiment incorporating the aspect of automatically draining a tank, a beverage forming machine includes a drain line which is positioned at the bottom of a hot water tank, and further includes a valve that selectively permits or blocks water flow through the drain line. When the user decides to drain the hot water tank, he or she may press a drain button on a control pad to open the valve in the drain line. To speed and/or improve drainage, the beverage forming machine may include an electrically powered component, such as an air pump and/or water pump, which forces the liquid out of the tank during draining. The drained liquid may be directed to any suitable location, such as a waste reservoir, a supply reservoir, a drain port on the housing exterior, etc.

In another embodiment, the controller may track various conditions present in the beverage forming machine and initiate automatic draining if a pre-selected condition is attained. For example, a user may instruct the controller to wait two hours before automatically draining the hot water tank, thereby allowing time for the water to cool before drainage. In another example, the controller may receive data from a temperature sensor, and the user may instruct the controller to drain the hot water tank after the water has cooled to a pre-selected temperature. In another embodiment, the controller may initiate draining of the tank if a certain amount of time passes without a beverage formation operation occurring.

In another aspect of the invention, a user need not position the beverage forming machine near a sink or other external receptacle when performing a draining operation. For example, a beverage forming machine may be provided with a self-contained drain feature in which beverage precursor liquid is removed from one tank and deposited in another tank that is part of, or otherwise supported by, the beverage forming machine. In one embodiment, water drained from a hot water tank may be deposited in a water supply reservoir. The reservoir may be removably attached to the machine housing such that the user may remove the reservoir from the housing, e.g., to fill and/or empty the reservoir. In another embodiment, the drain system may deposit water from the hot water tank into a waste reservoir. For disposal of the water, the waste reservoir may be removable from the machine housing. In another embodiment, the drain system may deposit water from the hot water tank into a non-removable tank, which may later be drained by some alternate method, such as a second mechanical or electrical drain valve or pump.

FIG. 1 shows a perspective view of a beverage forming system 1 in accordance with aspects of the invention. In this illustrative embodiment, the beverage forming system 1 is arranged to form brewed beverages, such as coffee, using water provided in a reservoir 2 that is removably attached to a housing 15, e.g., the reservoir 2 may rest on a platform or other support extending from the housing 15. In this illustrative embodiment, the beverage forming system 1 is arranged to receive disposable beverage forming cartridges (not shown), such as brewing cartridges, that are placed within a beverage forming chamber, such as a brew chamber, of a beverage forming station exposed by raising a handle 11. After the cartridge is provided to the system 1, a user may cause the system 1 to form a beverage by interacting with a user input and display 13 or by simply closing the brew chamber via the handle 11. To form the beverage, water from the reservoir 2 is provided to an internal tank (not shown) in which the water is heated and subsequently provided to the brew chamber. Beverage produced by the system 1 may be captured in a cup or other vessel placed on a platform 12. However, it should be understood that the beverage forming system 1, and any beverage forming system or machine described herein, may be arranged to produce any suitable beverage using at least in part any suitable liquid or liquids. For example, the beverage forming machine need not be limited to forming brewed beverages, such as coffee or tea, but may form beverages in other ways, such as providing hot water to be mixed with a powdered drink mix (e.g., hot chocolate), a liquid concentrate, or other suitable material in a cup for example.

Figure 2:
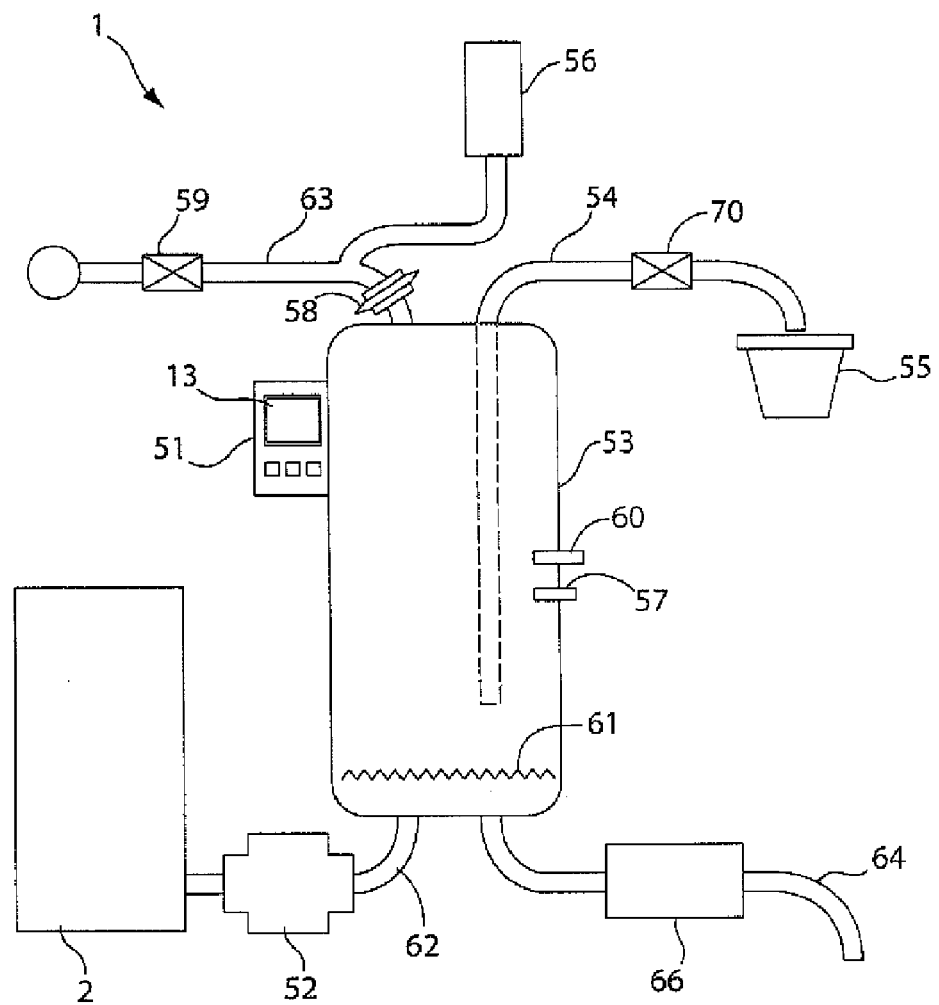
FIG. 2 shows a schematic diagram of a beverage forming system in accordance with one aspect of the invention.

FIG. 2 shows a schematic diagram of various components included in a beverage forming system 1 according to one aspect of the invention. These components may be incorporated into machine like that shown in FIG. 1. Water (or other beverage precursor liquid) from a reservoir 2 may be provided to a tank 53 by a supply system, e.g., that includes a water pump 52 and an inlet line 62. Operation of the water pump 52 and other components of the system 1 may be controlled by a controller 51, e.g., including a programmed processor and/or other data processing device along with suitable software or other operating instructions, one or more memories, input/output interfaces, communication buses or other links, a display, switches, relays, triacs, or other components used to perform desired input/output or other functions. The tank 53 may be filled with a desired amount of water (or other liquid) by any suitable technique, such as running the water pump 52 for a predetermined time, sensing a water level in the tank 53 using a conductive probe sensor or capacitive sensor, detecting a pressure in the tank 53, or using any other viable technique. For example, the controller 51 may detect that the tank 53 is completely filled when a pressure sensor 57 detects a rise in pressure indicating that the water has reached the top of the tank 53. Water in the tank may be heated, if desired, by way of a heating element 61 whose operation is controlled by the controller 51 using input from a temperature sensor 60. Water in the tank 53 may be dispensed via a discharge tube 54 to a brew chamber 55 or other beverage forming station. The brew chamber 55 may include any beverage making ingredient, such as ground coffee, tea, a flavored drink mix, or other substance. Water may be discharged from the tank 53 through the discharge tube 54 by a supply system that pressurizes the tank with air provided by an air pump 56. The discharge tube 54 that leads to the brew chamber 55 may be provided with a discharge tube valve 70, such as a mechanical check valve. Completion of the dispensing from the tank 53 may be detected in any suitable manner, such as by detecting a pressure drop with the pressure sensor 57, by detecting a water level change in the tank 53, or using any other viable techniques.

When filling the tank 53 with water from the reservoir 2, the tank 53 may be vented by opening a vent line 63 including a filter 58 and a vent valve 59. The filter 58 may prevent undesired items, such as minerals, scale deposits or other, from interfering with the operation of the vent valve 59. Typically, the vent valve 59 is closed when liquid is discharged from the tank 53 to the brew chamber 55.

A user may input commands or other information to the controller 51, and/or the controller 51 may provide information to the user via a user input/output display 13. The user input/output display 13 may include an LCD or other suitable display, and/or one or more operation buttons, knobs or other devices that may be used to control the system operation. The various valves, sensors, pumps and other components of the beverage forming system may be may be operatively connected to the controller 51 such that the components may receive control signals or other information from the controller 51 and/or may send information to the controller 51.

In the embodiment shown in FIG. 2, the beverage forming system 1 includes drain system that may be used to drain the beverage precursor liquid (e.g., water) from the tank 53. In one embodiment, the drain system may include a drain line 64 with a flow control element 66, e.g., a valve, a solenoid valve, a drain pump, a combination of a valve and a drain pump, or any other suitable flow control element. In some embodiments, the drain system may include some or all of the components in the supply system, such as the water pump 52 and/or the air pump 56. For example, in an embodiment in which the water pump 52 may be reversibly operated, the supply and drain system may include the same components, i.e., the water pump 52 may be used to both fill and empty the tank 53. That is, the water pump 52 and inlet line 62 may alternately function as a drain pump and drain line when pumping water from the tank 53 into the reservoir 2. In another embodiment in which the water pump 52 cannot pump liquid in two different directions, a drain line may be connected between the tank 53 and the inlet of the water pump 52 and between the outlet of the pump 52 and a location where the drained liquid is deposited. A valving arrangement may be provided in the drain and inlet lines 64 and 62 so that the pump 52 may be selectively used to pump liquid from the reservoir 2 to the tank 53, or pump liquid from the tank 53 for draining.

In the embodiment shown in FIG. 2 in which the flow control element 66 is a drain line valve, the drain system may include the drain line valve, the drain line 64 and the air pump 56. To place the beverage forming system 1 in a drain mode, the controller 51 may close the discharge tube valve 70 and the vent valve 59. (If the discharge tube valve 70 is a mechanical check valve, the controller 51 typically will not control its operation.) The controller 51 then opens the drain line valve 66 and activates the air pump 56, thereby forcing water out of the tank 53 with air pressure, such that it drains through drain line 64. If the discharge tube valve 70 is a mechanical check valve, the pressure used by the air pump 56 to move water out of the tank 53 may be lower than a pressure that causes the valve 70 to open. Alternately, the flow through the valve 70 may be sufficiently low so as to not inhibit draining of the tank 53 through the drain line 64. In an alternate embodiment, the tank 53 may be drained by gravity, without using air pressure from the pump 56 to drive the liquid from the tank 53. (In the embodiment shown, the pump 52 is configured such that it prevents liquid or gas from flowing from the tank 53 to the reservoir 2. However, the line 62 could include a one-way valve or other flow control device.)

In the FIG. 2 embodiment in which the flow control element 66 includes a drain pump, the drain system may include the drain pump and the drain line 64. With the vent valve 59 open and the air pump 56 not activated (or not present), the drain pump may be actuated to move water out of the tank 53 and through drain line 64. As discussed above, in another embodiment, the water pump 52 may function as part of the drain system to drain the tank 53.

The drain system of this embodiment, and other embodiments described herein, may substantially empty the tank 53. A substantially empty tank need not be completely void of all liquid, but rather may retain some residual water (or other beverage precursor liquid) in the form of droplets, water vapor, or small puddles. The tank 53 may be shaped in some embodiments to gather water at an inlet to the drain line 64. For example, a portion of the bottom of the tank 53 may be shaped as funnel, or other suitable shape, to direct water toward drain line 64 or other outlet.

Liquid emitted from the drain line 64 may be directed into any suitable receptacle, such as a countertop container or a kitchen sink. However, in one aspect of the invention, the beverage forming machine may have a self-contained drain feature such that liquid drained from the tank is directed to a receptacle attached to or otherwise associated with the machine housing. This self-contained drain feature may be used with the automated drain feature discussed above in which a controller automatically causes drainage of the tank 53, or may be used in a system having a purely manually operated drain feature, e.g., where a user opens a manual drain valve to drain the tank 53. Drained water may be deposited in a waste tank, which may be removable from the housing. In another embodiment, the drained liquid may be directed into the reservoir 2, whether for reuse or disposal by a user.

Figure 3:
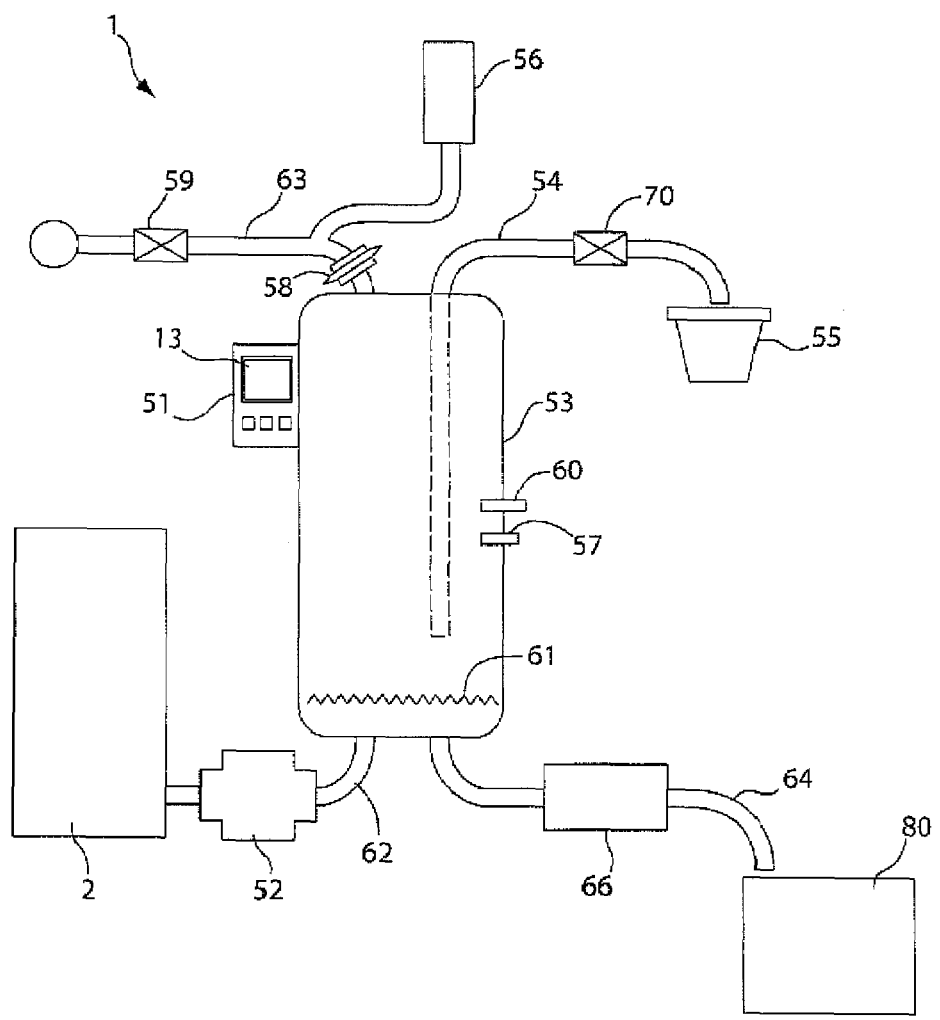
FIG. 3 shows a schematic diagram of a beverage forming system in accordance with another aspect of the invention.

FIG. 3 shows a schematic view of a beverage forming system 1 that includes a waste reservoir 80 that receives water from the drain line 64. The drain line 64 may be connected to the reservoir 80, or may simply have an outlet positioned so that drained liquid empties into the reservoir 80. For purposes herein, the term "waste reservoir" means a receptacle that accepts liquid intended for disposal. Similar to the embodiment shown in FIG. 2, water may be forced from the tank 53 by air pressure or with a pump. In some embodiments, the waste reservoir 80 may be positioned at a lower level than the tank 53, such that gravity alone is able to substantially empty water from the tank 53. The waste reservoir 80 may include a tray or other container that is supported by the housing, e.g., rests in or on a portion of the housing. The reservoir 80 may be positioned in any suitable location in or on the housing 15, such as on the platform 12 in the FIG. 1 embodiment. The drain line 64 may be arranged to drain liquid via a pathway that is completely separate from a pathway used to provide liquid to the beverage forming station, or may drain liquid via a pathway that includes at least a portion of a pathway used to form a finished beverage. Thus, in some embodiments, drained liquid may exit from a same opening at the beverage forming station as finished beverage exits, although not as finished beverage.

In this embodiment, the flow control element 66 may be a drain line valve that is controlled by the controller 51, or it may be a manually operated valve. In embodiments where the drain line valve is a manually operated valve, the controller 51 may include a display that indicates to the user when the system is ready for the valve to be opened, e.g., when the liquid in the tank 53 is cool enough to be drained. While in some of the embodiments, all of the valves may be controlled with the controller 51, in some embodiments, none or very few of the valves (e.g., vent valve 59, discharge tube valve 70, the drain line valve) are controlled by the controller 51. The tank 53 may also include one or more sensors that detect when the tank 53 is substantially empty. Such sensors may operate using any suitable means, such as detecting the presence/absence of liquid via conductivity changes, capacitive sensing, optical sensing, etc. The output from one or more such sensors may be used by the controller 51 to determine whether to cease draining operations and/or to provide an indication (visual, aural or otherwise) that draining is complete. In some embodiments, the draining operation may continue until stopped by the user.

Figure 4:
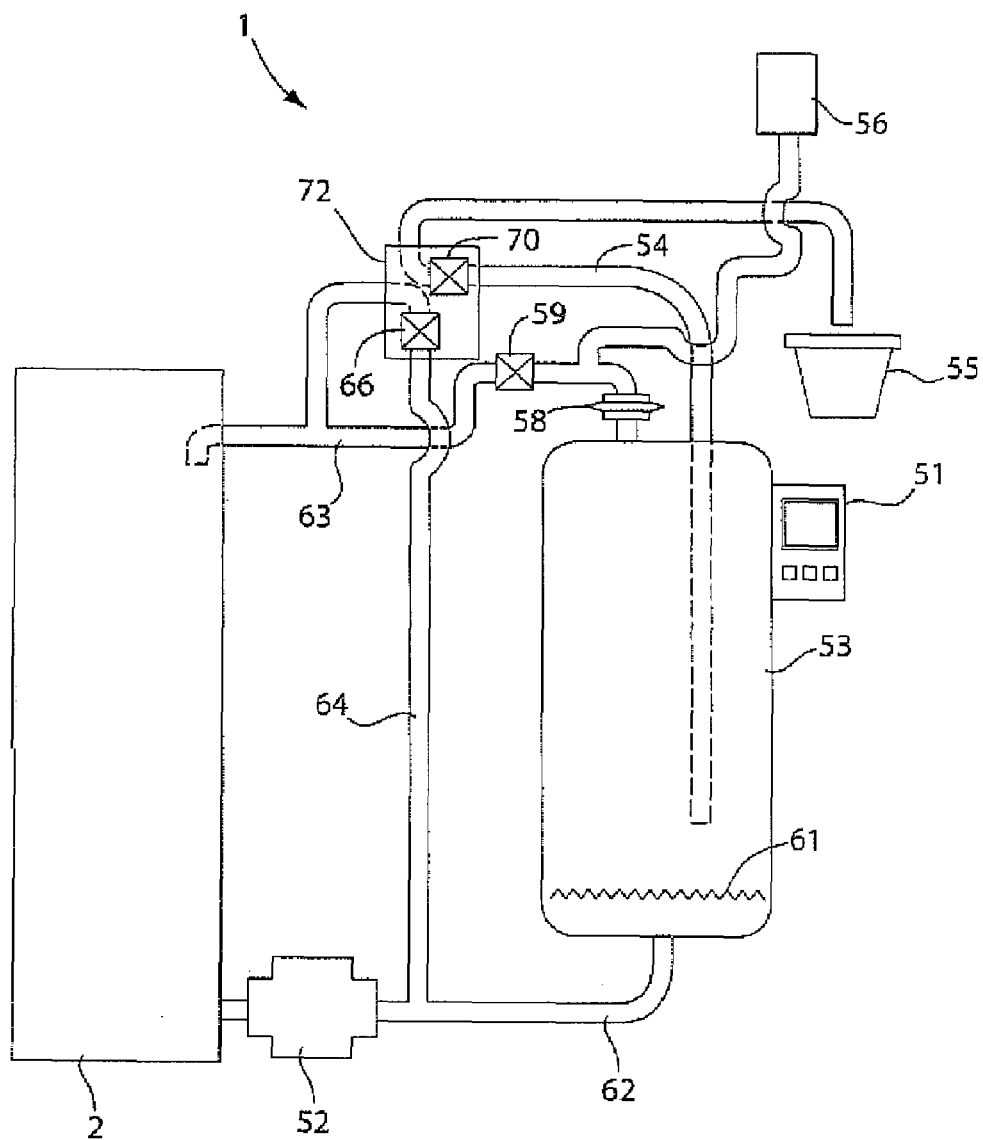
FIG. 4 shows a schematic diagram of an alternative embodiment of a beverage forming system.

To reduce the number of tanks in the apparatus, instead of depositing drained water in a waste reservoir, according to one aspect of the invention, liquid drained from a tank may be deposited back into a supply reservoir. FIG. 4 shows a schematic diagram of a beverage forming system 1 that deposits drained water back into a reservoir 2. The embodiment shown in FIG. 4 and described below includes one particular arrangement of valves, pumps, filters, etc., but it should be understood that any suitable fluid handling arrangement may be used to drain liquid from a tank into a supply reservoir.

In this embodiment, with drain line valve 66 closed and vent valve 59 open, the water pump 52 may supply water from the reservoir 2 to the tank 53. If desired, the water in the tank 53 may be heated with the heating element 61 to a desired temperature. To dispense the water to the brew chamber 55 through the discharge tube 54 to form a beverage, the drain valve 66 and vent valve 59 are closed, and the air pump 56 pressurizes the tank 53 to drive water up and out the discharge tube 54. To allow the water to flow to the brew chamber 55, the discharge tube valve 70 is opened.

To place the beverage forming system 1 in a drain mode, discharge tube valve 70 is closed, vent valve 59 is closed, and drain valve 66 is opened. As air pump 56 pressurizes the tank 53, the water is forced out of the tank 53 and into the drain line 64. The drain line 64 merges with the vent line 63 which opens into an upper region of the reservoir 2. In this manner, the water remaining in the tank 53 after beverage formation may be drained to the reservoir 2. The reservoir 2 may be removable in some embodiments such that the drained water can be stored or disposed at a location remote from the remainder of the beverage forming system 1.

The discharge tube valve 70 and the drain valve 66 may be positioned separately within the beverage forming system 1, or they may be positioned in close proximity or even within a common housing 72. In one embodiment, the discharge tube valve 70 and the drain valve 66 are positioned within the housing 72 such that a single manual or automatic action opens the drain valve 66 and closes the discharge tube valve 70. For example, a user may press a button that manually opens the drain valve 66 and closes the discharge tube valve 70. Pressing this button (which may be included as part of the controller 51) may also cause the air pump 56 to operate, thereby causing automatic draining of the tank 53.

The drain line 64 need not merge with vent line 63, and instead may be connected to the reservoir 2 at a different location. The inlet line 62 that connects the reservoir 2 to the tank 53 may have a connection to the tank 53 that is separate from the drain line 64 connection to the tank 53. In another embodiment, the drain line 64 may merge with the discharge tube 54 between the discharge tube valve 70 and the brew chamber 55 so that drained liquid exits through the brew chamber 55 to a waste reservoir positioned in a location where finished beverage is normally received.

One example of an operations sequence for one embodiment of the invention is provided below. It is important to note that this operations sequence is provided by way of example only, and any suitable operations sequence may be used in conjunction with various physical embodiments of a beverage forming system.

In one embodiment, once the user desires to empty the tank of a beverage forming machine, the user may cause a drain line valve to open, e.g., by pressing a control button on the machine to actuate a drain line valve, a vent valve or other valves required to drain the tank. The machine controller (whether by manual button/electrical switch control and/or via relay(s) under the control of a microprocessor) may suitably control the necessary valves and optionally indicate to the user that the machine is ready for draining, e.g., by illuminating a drain LED. Thereafter, the controller may automatically begin the drain process or wait for additional input from the user to begin draining. The controller may then cause an air pump to operate, thereby pressurizing the tank and forcing water out of the tank through the drain line and into a reservoir. When predominantly air exits the drain line, the tank may be deemed substantially empty, and the controller may stop the drain operation. The controller may determine that the tank is substantially empty by detecting a drop in pressure in the tank, signifying that mainly air is exiting the drain line.

In alternative embodiments, the reservoir 2 may be positioned at a higher level than the tank 53 and to allow the beverage forming system 1 to gravity feed water into the tank 53, thereby eliminating pump 52. In such embodiments, a valve may be included on inlet line 62. While the beverage forming system 1 has been described as including a reservoir, the water may be supplied to the tank 53 with a connection to a water supply such as a home's plumbing system. In such embodiments, instead of providing pump 52, a valve may be provided on the inlet line 62 and a pressure reducer may be used.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," or "involving," and variations thereof herein, is meant to encompass the items listed thereafter and equivalents thereof as well as additional items.

What is claimed is:

1. A beverage forming system comprising:
    a housing;
    a tank attached to the housing for holding a beverage precursor liquid;
    a reservoir that is configured to provide the beverage precursor liquid to the tank;
    a beverage forming station fluidically connected to the tank, the beverage forming station attached to the housing and configured to form a beverage in part by using the beverage precursor liquid;
    a supply system configured to provide beverage precursor liquid from the tank to the beverage forming station for forming the beverage;
    a drain system configured to substantially empty the tank of beverage precursor liquid during a drain operation, wherein the drain system deposits beverage precursor liquid that is removed from the tank in the reservoir; and
    a controller adapted to control the supply system in a beverage forming mode to provide beverage precursor liquid from the tank to the beverage forming station for forming the beverage, and is adapted to control the drain system in a drain mode to automatically perform the drain operation.

2. A system as in claim 1, wherein the drain system forces the beverage precursor liquid from the tank.

3. A system as in claim 2, wherein the drain system forces the beverage precursor liquid from the tank using pressurized gas.

4. A system as in claim 2, wherein the drain system includes a pump that pumps the beverage precursor liquid from the tank.

5. A system as in claim 1, wherein the tank is configured to hold an amount of beverage precursor liquid at least equal to a volume of the beverage formed at the beverage forming station.

6. A system as in claim 1, wherein the beverage precursor liquid is heated in the tank.

7. A system as in claim 1, wherein the system is configured to accept a beverage forming cartridge.

8. A system as in claim 1, wherein the controller is adapted to control the drain system to automatically drain the tank in response to an input from a user.

9. A system as in claim 1, wherein the controller is adapted to control the drain system to automatically drain the tank after a specified condition is met.

10. A system as in claim 1, wherein the reservoir is removably attached to the housing, and the system further comprises a pump that moves beverage precursor liquid from the reservoir to the tank.

11. A system as in claim 1, wherein the drain system drains the beverage precursor liquid from the tank via a pathway that is different, at least in part, from a pathway by which beverage precursor liquid is provided to the beverage forming station for formation of a beverage.

12. A system as in claim 1, further comprising a liquid inlet line which connects the reservoir to the tank.

13. A method for draining the contents of a tank used in a beverage forming machine, comprising:
    providing a beverage forming machine including a tank, a reservoir arranged to supply beverage precursor liquid to the tank, and a beverage forming station fluidically connected to the tank;
    providing a volume of a beverage precursor liquid to the tank;
    substantially emptying the tank of the beverage precursor liquid by removing the beverage precursor liquid from the tank and depositing the beverage precursor liquid in the reservoir; and
    removing the reservoir from the machine after the beverage precursor liquid has been deposited into the reservoir.

14. A method as in claim 13, wherein the beverage forming machine is configured to move the beverage precursor liquid from the reservoir to the tank.

15. A method as in claim 13, wherein substantially emptying the tank comprises forcing the beverage precursor liquid from the tank.

16. A method as in claim 15, wherein forcing the beverage precursor liquid from the tank comprises providing a pressurized gas in the tank.

17. A method as in claim 15, wherein forcing the beverage precursor liquid from the tank comprises pumping the beverage precursor liquid from the tank.

18. A method as in claim 13, further comprising heating the beverage precursor liquid in the tank.

19. A system as in claim 13, wherein providing a volume of a beverage precursor liquid to the tank comprises providing a volume of a precursor liquid to the tank via a liquid inlet line which connects the reservoir to the tank.

20. A beverage forming system comprising:
    a housing;
    a tank attached to the housing for holding a beverage precursor liquid;
    a beverage forming station fluidically connected to the tank, the beverage forming station attached to the housing and configured to form a beverage in part by using the beverage precursor liquid;
    a supply system configured to provide beverage precursor liquid from the tank to the beverage forming station for forming the beverage;
    a drain system configured to substantially empty the tank of beverage precursor liquid during a drain operation, wherein the drain system forces the beverage precursor liquid from the tank using pressurized gas; and
    a controller adapted to control the supply system in a beverage forming mode to provide beverage precursor liquid from the tank to the beverage forming station for forming the beverage, and is adapted to control the drain system in a drain mode to automatically perform the drain operation.

21. A system as in claim 20, wherein the tank is configured to hold an amount of beverage precursor liquid at least equal to a volume of the beverage formed at the beverage forming station.

22. A system as in claim 20, wherein the beverage precursor liquid is heated in the tank.

23. A system as in claim 20, wherein the system is configured to accept a beverage forming cartridge.

24. A system as in claim 20, further comprising a reservoir that is configured to provide beverage precursor liquid to the tank, wherein the reservoir is removably attached to the housing, and the system further comprises a pump that moves beverage precursor liquid from the reservoir to the tank.

25. A beverage forming system comprising:
- a housing;
- a tank attached to the housing for holding a beverage precursor liquid;
- a beverage forming station fluidically connected to the rank, the beverage forming station attached to the housing and configured to form a beverage in part by using the beverage precursor liquid;
- a supply system configured to provide beverage precursor liquid from the tank to the beverage forming station for forming the beverage;
- a drain system configured to substantially empty the tank of beverage precursor liquid during a drain operation, wherein the drain system includes a pump that pumps the beverage precursor liquid from the tank; and
- a controller adapted to control the supply system in a beverage forming mode to provide beverage precursor liquid from the tank to the beverage forming station for forming the beverage, and is adapted to control the drain system in a drain mode to automatically perform the drain operation.

26. A system as in claim 25, wherein the tank is configured to hold an amount of beverage precursor liquid at least equal to a volume of the beverage formed at the beverage forming station.

27. A system as in claim 25, wherein the beverage precursor liquid is heated in the tank.

28. A system as in claim 25, wherein the system is configured to accept a beverage forming cartridge.

29. A system as in claim 25, further comprising a reservoir that is configured to provide beverage precursor liquid to the tank, wherein the reservoir is removably attached to the housing, and the system further comprises a pump that moves beverage precursor liquid from the reservoir to the tank.

30. A beverage forming apparatus comprising:
- a housing;
- a beverage forming station attached to the housing and configured to form a beverage in part using a beverage precursor liquid;
- a tank attached to the housing and configured to supply the beverage precursor liquid to the beverage forming station;
- a reservoir supported by the housing; and
- a drain system configured to substantially empty the beverage precursor liquid from the tank into the reservoir, wherein the drain system forces the beverage precursor liquid from the tank, and the drain system includes an air pump that pumps air into the tank.

31. An apparatus as in claim 30, wherein the air pump that pumps air into the tank forces the beverage precursor liquid to move from the tank to the reservoir.

32. An apparatus as in claim 30, wherein the reservoir is removable from the housing.

33. An apparatus as in claim 30, further comprising a controller adapted to control the drain system to automatically move the beverage precursor liquid from the tank to the reservoir.

34. An apparatus as in claim 30, wherein the tank is configured to hold an amount of beverage precursor liquid at least equal to a volume of the beverage formed at the beverage forming station.

35. An apparatus as in claim 30, wherein the beverage precursor liquid is heated in the tank.

36. An apparatus as in claim 30, wherein the apparatus is configured to accept a beverage forming cartridge.

37. A method for draining the contents of a tank used in a beverage forming machine, comprising:
- providing a beverage forming machine including a tank, a reservoir arranged to supply beverage precursor liquid to the tank, and a beverage forming station fluidically connected to the tank;
- providing a volume of a beverage precursor liquid to the tank; and
- substantially emptying the tank of the beverage precursor liquid by removing the beverage precursor liquid from the tank and depositing the beverage precursor liquid in the reservoir, wherein substantially emptying the tank comprises forcing the beverage precursor liquid from the tank, and
- forcing the beverage precursor liquid from the tank comprises providing a pressurized gas in the tank.

38. A method as in claim 37, wherein the beverage forming machine is configured to move the beverage precursor liquid from the reservoir to the tank.

39. A method as in claim 37, further comprising heating the beverage precursor liquid in the tank.

\* \* \* \* \*

UNITED STATES PATENT AND TRADEMARK OFFICE
CERTIFICATE OF CORRECTION

PATENT NO. : 7,640,845 B2
APPLICATION NO. : 11/224672
DATED : January 5, 2010
INVENTOR(S) : Woodnorth et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1050 days.

Signed and Sealed this

Sixteenth Day of November, 2010

David J. Kappos
*Director of the United States Patent and Trademark Office*